S. BAADER & A. RIEFFEL.
TIRE.
APPLICATION FILED OCT. 27, 1917.
1,261,341.
Patented Apr. 2, 1918.
2 SHEETS—SHEET 1.
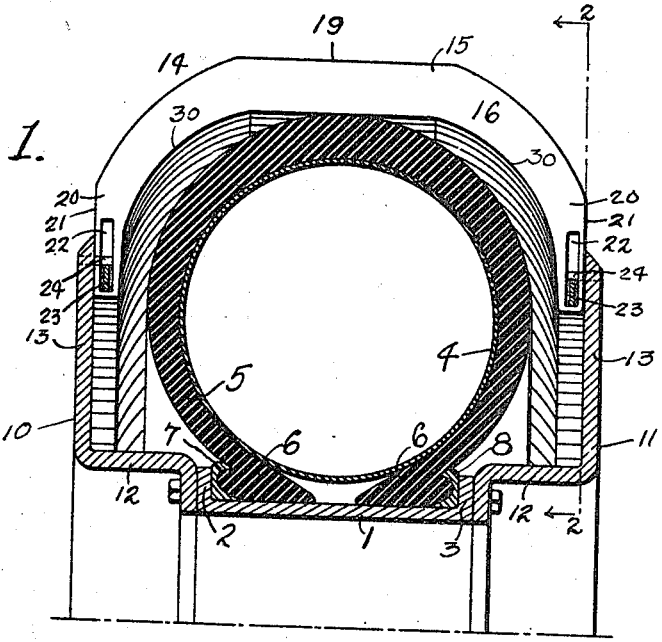
Fig. 1.
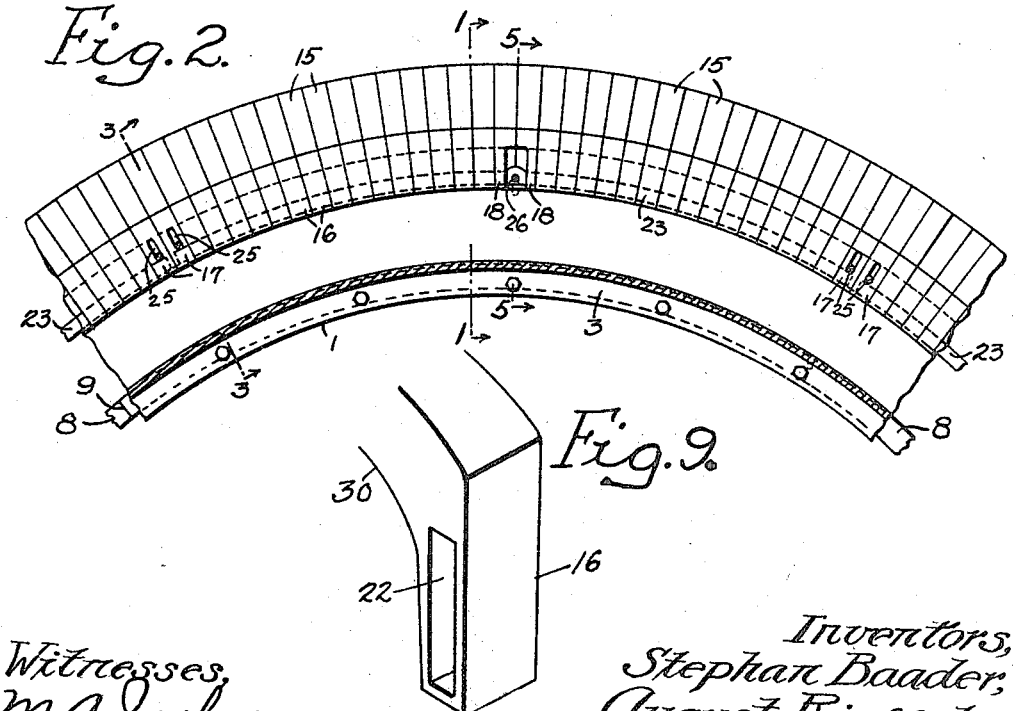
Fig. 2.
Fig. 9.
Witnesses,
M. A. Inglav.
E. E. Reichart.
Inventors,
Stephan Baader,
August Rieffel,
By Joshua R. H. Potts
their Attorney

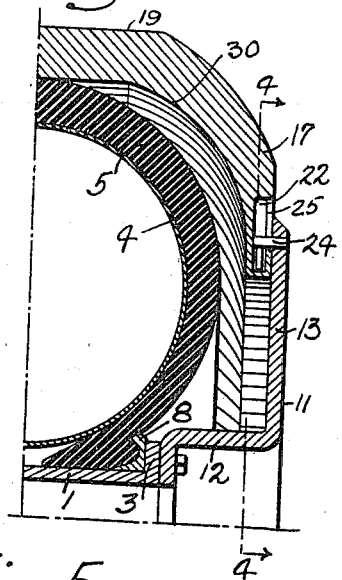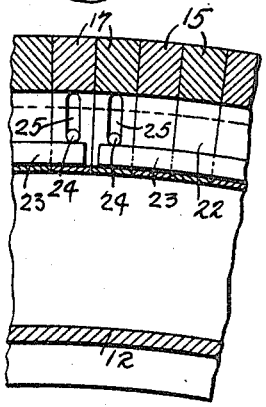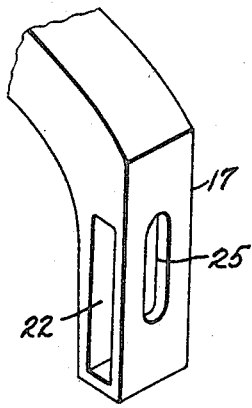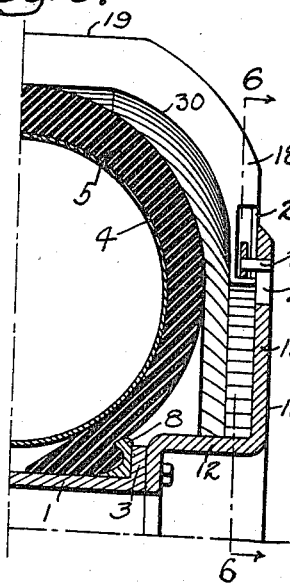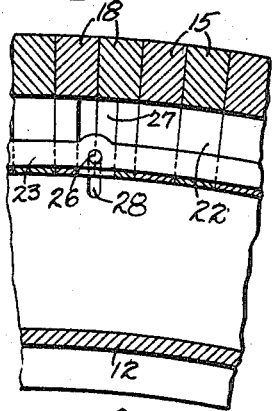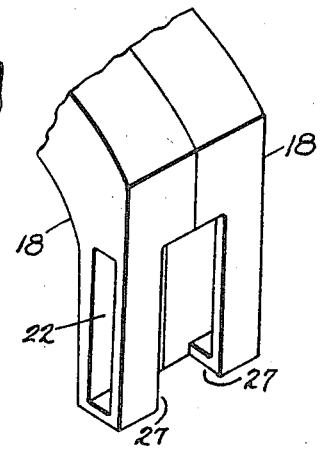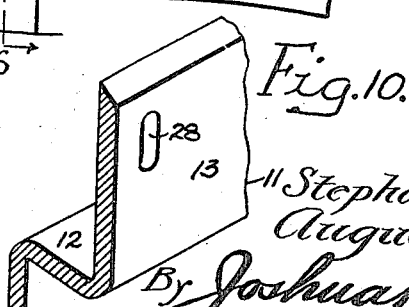

UNITED STATES PATENT OFFICE.

STEPHAN BAADER AND AUGUST RIEFFEL, OF PHILADELPHIA, PENNSYLVANIA.

TIRE.

1,261,341.                    Specification of Letters Patent.    Patented Apr. 2, 1918.

Application filed October 27, 1917. Serial No. 198,755.

*To all whom it may concern:*

Be it known that we, STEPHAN BAADER and AUGUST RIEFFEL, citizens of the United States, residing at Philadelphia, county of Philadelphia, and State of Pennsylvania, have invented certain new and useful Improvements in Tires, of which the following is a specification.

One object of our invention is to provide an improved vehicle wheel tire which will be extremely durable and will be practically unpuncturable by articles encountered on the roadway.

Another object is to so construct our improved tire that it will provide easy riding for the vehicle and will absorb shocks due to its engagement with stones or irregular parts on the roadway.

These objects, and other advantageous ends which will be described hereinafter, we attain in the following manner, reference being had to the accompanying drawings in which—

Figure 1 is a transverse section of our improved tire, taken on the line 1—1 of Fig. 2 and drawn on an enlarged scale, Fig. 2 is a fragmentary circumferential section taken on the line 2—2 of Fig. 1 and drawn on a smaller scale, Fig. 3 is a fragmentary transverse section taken on the line 3—3 of Fig. 2 and drawn on an enlarged scale, Fig. 4 is a fragmentary section taken on the line 4—4 of Fig. 3, Fig. 5 is a fragmentary transverse section taken on the line 5—5 of Fig. 2 and drawn on an enlarged scale, Fig. 6 is a fragmentary section taken on the line 6—6 of Fig. 5, Fig. 7 is a perspective view of one end of a tread segment which forms a part of our invention, Fig. 8 is a perspective view of the adjacent ends of two other forms of tread segments which we employ, Fig. 9 is a perspective view of one end of another type of tread segment which is included in our improved tire, and Fig. 10 is a fragmentary perspective view of a guiding ring which forms a part of our invention.

Referring to the drawings, 1 represents a band 1 which is adapted to surround the felly of a vehicle wheel (not illustrated) and this band has two annularly extending flanges 2 and 3. A tube 4 made of rubber or other resilient material is adapted to be inflated. A shoe 5 forms a covering for the tube 4 and extends circumferentially of the band 1 and has beaded edges 6 which are held between the flanges 2 and 3 by rings 7 and 8 which are preferably split transversely of their length, as shown at 9 in Fig. 2.

The flanges 2 and 3 of the band 1 form bearings to which are secured guiding rings 10 and 11. Each of the guiding rings 10 and 11 has an axially extending flange 12 and a peripherally extending flange 13. The flanges 13 extend substantially parallel and inclose opposite sides of the shoe 5, as clearly shown in Fig. 1, and between the inner surfaces of these flanges 13 is adapted to slide a tread 14. This tread is made up of a number of segments 15 which are preferably made of extremely tough material, such as raw hide, fiber or the like.

There are three different types of these segments illustrated, these types being respectively indicated at 16, 17, and 18. Each of the segments 15 has a tread surface 19 and two ends 20. The ends 20 have surfaces 21 which are adapted to slide between the inner surfaces of the flanges 13 of the respective rings 10 and 11. Furthermore each end of each of the segments 15 has a slot 22 extending therethrough and these slots are designed to register with each other and permit the insertion of segmental links 23 which extend circumferentially, as clearly shown in Fig. 2. Each link 23 extends through a predetermined number of the segments 15, the opposite ends of each of the links terminating within the slots 22 of each of the type 17 of the segments 15. Thus the segments are arranged in groups, each group having one of the type 17 of segments 15 at its opposite end, and furthermore each group of segments houses one of the links 23.

Each of the flanges 13 has pins 24 which are adapted to extend into slots 25 of the end segments of each of the groups. Each of the segmental links 23 has a pin 26 which extends outwardly through cut-off portions 27 in the type 18 of segments 15 which are located intermediate of the end segments of each group. These pins 26 are adapted to ride within slots 28 in each of the flanges 13. Thus the segments 15 are secured together but are permitted to slide toward or from the axis of the wheel upon which the tire is placed.

The shoe 5 serves as a resilient cushion for the segments 15 so that as successive sections engage the road bed during the rotation of the wheel there will be a relative sliding movement between the ends 20 and the flanges 13 which will also cause the compression of the inflated tube 4 and shoe 5. However, as the pressure on the segments is released, due to the rotation of the wheel, the tube 4 and shoe 5 will expand to its normal position and again move the tread sections relatively to the flanges 13 so that the tread sections will remain in a normal position until again brought into engagement with the roadway.

It of course will be understood that there is sufficient room between the segments to permit the necessary sliding action. The segments 15 have concaved inner portions 30 which permit the shoe 5 to slightly flatten without injuring the same and also to provide an even pressure against the inner surfaces of the tread sections.

The type 16 of the segments 15, which are intermediate the end segments of each group and also intermediate the segments of the type 18, are retained by the links 23, the slots 22 in the segments permitting a predetermined amount of independent movement between the links 23 and the segments 16. Thus the links 23 can move inwardly toward the axis of the wheel by the provision of the slots 28 in the flanges 13 and the segments are thus kept under control during the rotation of the wheel, it being noted that the end segments of each group have a movement inwardly to the extent of the length of the slots 25.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:

1. A tire including means providing flanges spaced apart; a tread including a plurality of segments each having ends for slidable engagement with said flanges, said segments having registering slots in their ends; segmental links each extending circumferentially through the slots of a respective group of said segments; and means for movably connecting said links to the flanges, substantially as described.

2. A tire including means providing flanges spaced apart; a tread including a plurality of segments each having ends for slidable engagement with said flanges, said segments having registering slots in their ends; segmental links each extending circumferentially through the slots of a respective group of said segments; means for movably connecting said links to the flanges; the ends of certain of said segments having additional slots therein; and pins on said flanges adapted to respectively engage said latter slots, substantially as described.

3. A tire including means providing flanges spaced apart; a tread including a plurality of segments each having ends for slidable engagement with said flanges, said segments having registering slots in their ends; segmental links each extending circumferentially through the slots of a respective group of said segments; means for movably connecting said links to the flanges; the ends of certain of said segments having additional slots therein; and pins on said flanges adapted to respectively engage said latter slots, said latter slots being positioned in the end segments of each group, substantially as described.

4. A tire including means providing flanges spaced apart; a tread including a plurality of segments each having ends for slidable engagement with said flanges, said segments having registering slots in their ends; segmental links each extending circumferentially through the slots of a respective group of said segments; said segments having slots therein; and pins on said links extending through said slots, certain of said segments being cut away to permit said pins to extend therethrough, substantially as described.

In testimony whereof we have signed our names to this specification in the presence of two subscribing witnesses.

STEPHAN BAADER.
AUGUST RIEFFEL.

Witnesses:
 MARY A. INGLAR,
 CHAS. E. POTTS.

Copies of this patent may be obtained for five cents each, by addressing the "Commissioner of Patents, Washington, D. C."